United States Patent [19]

Galloway

[11] Patent Number: 4,823,666

[45] Date of Patent: Apr. 25, 1989

[54] STAND FOR PORTABLE BAND SAW

[76] Inventor: Ronald G. Galloway, 87 Tappan St., Baldwinsville, N.Y. 13027

[21] Appl. No.: 191,433

[22] Filed: May 9, 1988

[51] Int. Cl.⁴ .................... B23D 53/00; B23D 55/00; B23D 55/02
[52] U.S. Cl. ........................... 83/788; 83/574; 30/296 R; 30/374; 30/380
[58] Field of Search ............ 83/788, 574; 30/296 R, 30/374, 380; 408/135, 98, 712

[56] References Cited

U.S. PATENT DOCUMENTS

| | | | |
|---|---|---|---|
| 1,646,589 | 10/1927 | Meek et al. | 83/574 |
| 2,672,770 | 3/1954 | Buck | 408/712 |
| 2,798,513 | 7/1957 | Gray . | |
| 3,117,600 | 1/1964 | Davis | 83/574 |
| 3,621,894 | 11/1971 | Niksich . | |
| 3,961,550 | 6/1976 | Oliver et al. . | |
| 4,193,192 | 3/1980 | Cortez . | |
| 4,320,679 | 3/1982 | Trudeau | 83/574 |
| 4,491,047 | 1/1985 | Butkiewicz et al. | 30/380 |
| 4,538,494 | 9/1985 | Wirfelt | 83/788 |
| 4,573,385 | 3/1986 | Funkhouser | 83/788 |
| 4,677,887 | 7/1987 | Martin . | |

FOREIGN PATENT DOCUMENTS

373901 6/1932 Fed. Rep. of Germany .

Primary Examiner—Douglas D. Watts
Assistant Examiner—Scott A. Smith
Attorney, Agent, or Firm—Wall and Roehrig

[57] ABSTRACT

A stand for supporting a portable band saw in a stationary upright position. The saw includes a casing, a pair of spaced apart pulleys mounted in opposed housings on the casing for rotatably supporting an endless saw blade, a trigger guard attached to the back of the casing behind the motor housing and a threaded hole formed in the front of the casing forward of the motor housing for removably mounting a hand knob thereupon. The stand includes a support unit having a horizontally disposed base plate, a vertically disposed pedestal secured to the base plate and a raised support arm removably secured to the pedestal whereby the arm can be changed in assembly to accommodate different size saws. A cradle is formed in the lower part of the support unit which encircles a portion of the trigger guard of the band saw. When mounted in the stand, the hand knob of the saw is removed from the casing and a locking screw located in the upper part of the removable arm is threaded into the vacated hole to securely pull the casing of the band saw securely against the support unit.

9 Claims, 6 Drawing Sheets

STAND FOR PORTABLE BAND SAW

BACKGROUND OF THE INVENTION

This invention relates to a universal stand for mounting a portable band saw in a stationary, upright position upon a work bench or the like.

As described by Martin in U.S. Pat. No. 4,677,887, holding fixtures have been devised by which portable band saws can be secured to a work bench to convert the band saw to a stationary tool. As described by Martin, the fixture involves a base plate having two spaced apart vertical support members adapted to slidably receive therein the frame of a saw. Because of the fixed spacing between the opposing support members, the Martin fixture is limited to use in conjunction with only one model saw. Models having different size frames cannot be secured between the opposed support members. It should be further noted that the saw mounted within the Martin fixture is not clamped or otherwise secured in assembly. The support members are also relatively short in order that the exposed or working part of the blade can be accessed to a workpiece. As a consequence, the saw may be unstable which, under certain conditions, can adversely effect the accuracy of the cut and may pose a danger to the user.

Oliver, et al. in U.S. Pat. No. 3,961,550, like Martin, provides apparatus for converting a portable band saw to a stationary tool. Oliver straps the saw in a special bench fixture involving a yoke-like base for receiving the saw motor housing. Straps are passed about the housing and are tightened down to lock the housing securely within the yoke. Jack screws are vertically mounted in the base and pass upwardly to engage a special table that is secured to the saw frame. When the jack screws are tightened down, they provide additional rigidity to the saw. This particular fixture is limited for use only in applications where the saw motor housing projects perpendicularly from the side wall of the frame.

It should be noted, however, that the newer portable modern day band saws have adopted a more streamlined design wherein the motor lies parallel with the plane of the saw blade and is housed inside a casing that forms the backbone of the tool. In the newer arrangement, a hand-held trigger guard extends rearwardly behind the motor while a hand knob is threaded into the casing in forward of the motor. The pulley shields are attached to the front and back of the casing and power is transmitted from the motor to the pulleys through a transmission system. The weight of the motor is thus evenly distributed between the operator's hands as is the weight of the pulley system. Accordingly, the hand-held tool is more easily maneuvered and provides greater safety for the operator.

Applicant has noted that the basic geometry of the newer streamlined band saws is generally the same. That is, the motor is typically suspended between a trigger guard and a hand knob in the manner described above. By experimentation with a number of different saws marketed by various manufacturers, applicant has been able to devise a stand that can be simply adapted to universally convert a large majority of the presently available band saws from portable units to stationary tools. Although the present device is relatively simple in construction, it is fully capable of securely holding a portable band saw in a stationary, upright position so that it can be safely used by the operator.

It should be further noted that all of the prior art devices for converting portable band saws into stationary tools fail to provide any means by which the saw trigger can be actuated. The operator is forced to hold the trigger down with one hand while the workpiece is fed into the blade with the other hand. This presents a highly undesirable and potentially dangerous situation for if the saw happens to bind in the work, the operator's hand can be pulled into the blade. The use of both hands in this manner can also be fatiguing.

SUMMARY OF THE INVENTION

It is therefore an object of the present invention to improve holding fixtures for converting portable band saws into stationary tools.

A still further object of the present invention is to improve the stability and safety of stands used to convert portable band saws into stationary tools.

Another object of the present invention is to provide a stand for a portable band saw that can be adapted to securely hold different size saws in a secure vertical working position.

Yet another object of the present invention is to provide a universal stand for converting a portable band saw into a stationary tool that has a trigger actuating mechanism adapted to depress and hold the saw trigger at any desired setting, thereby freeing both of the operator's hands.

These and other objects of the present invention are attained by means of a stand for supporting a portable band saw of the type having a casing, a pair of spaced apart pulleys mounted on the casing between which an endless saw blade is suspended, a trigger guard mounted on the back of the casing behind the motor and a threaded hole in the front of the casing forward of the motor for receiving a hand knob therein, said stand further including a support unit having a horizontally disposed base, a vertically disposed pedestal secured to the base, and a raised arm movably secured to the pedestal whereby the arm can be changed to accommodate different size saws. A cradle is formed in the lower part of the support unit for encircling the trigger guard of the saw and a locking screw is passed through the upper part of the arm and secured in the threaded hole formed in the front of the casing to hang the saw in the unit. Tightening the locking screw pulls the casing of the machine tightly against the arm and securely locks the saw into the stand thus providing a stable platform for the saw. The stand further includes a trigger actuating mechanism mounted on the pedestal which is adapted to hold the trigger of the saw at any desired setting.

BRIEF DESCRIPTION OF THE DRAWINGS

For a better understanding of these and other objects of the present invention reference will be made to the following detailed description of the invention which is to be read in conjunction with the accompanying drawings, wherein.

DETAILED DESCRIPTION OF THE INVENTION

Referring now to FIGS. 1-6, there is shown a portable band saw 10 of conventional design which is mounted within a stand 12 that embodies the teachings of the present invention. The present band saw consists of a main casing 17 to which is attached a pair of opposed pulley housing 18 and 19. The main casing, which forms the backbone of the saw, is typically formed up of a number of different components that are fabricated of metal, plastic or the like. A drive pulley 20 (FIG. 2) is mounted inside the rear pulley housing 18 while an idler pulley 21 is similarly mounted within the front pulley housing 19. An endless saw blade 13 is suspended between the pulleys so that an exposed portion of the blade is caused to move through a work station 15. A variable speed motor 23 is centrally supported in the main casing along the backbone of the tool and is operatively connected to the drive pulley through means of a power transmission 25. As will be explained in greater detail below, the stand is arranged to securely support the band saw in an upright position so that the exposed section of blade passing through the work station is held in vertical alignment.

A hand engageable trigger guard 27 is mounted on the back of the main casing immediately behind the motor housing 23. The guard includes a hand grip 28 that contains a spring biased depressable trigger 30 that is normally engaged by the index finger of the operator's gripping hand when the tool is being used in a portable manner. An electrical cord 31 is passed into the trigger guard and is connected to a motor control switch (not shown) which is actuated by trigger 30. Depressing the trigger, which is normally spring loaded in an off position, provides electrical current to flow to the motor. In this particular embodiment, the speed of the variable speed motor, and thus the speed of the saw blade, is controlled by the amount that the trigger is depressed. In other types of saws, however, a single speed motor may be employed, whereby the switch is adapted to simply turn the motor on when it is depressed a certain distance.

Figure 1:
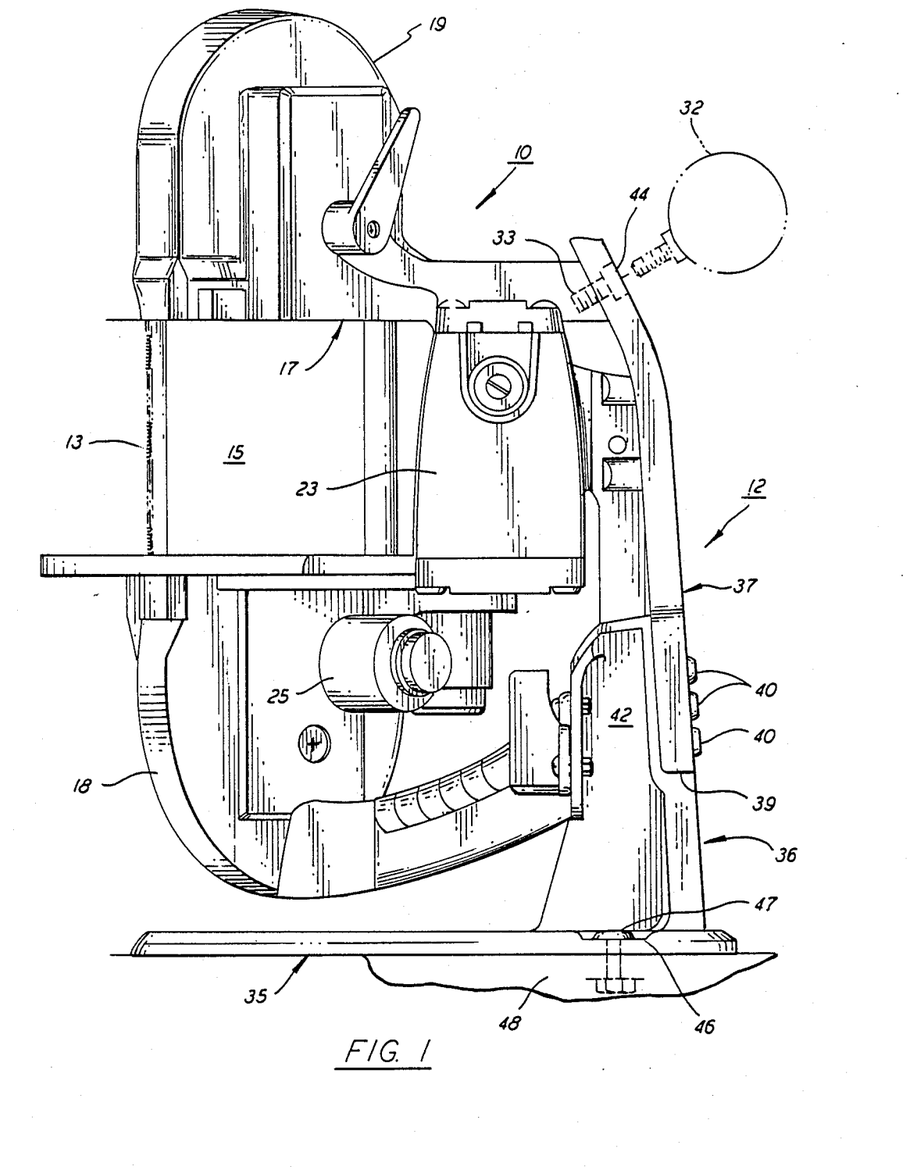
FIG. 1 is a front side elevation of a stand embodying the teachings of the present invention showing a portable band saw suspended therein an upright position.
Figure 2:
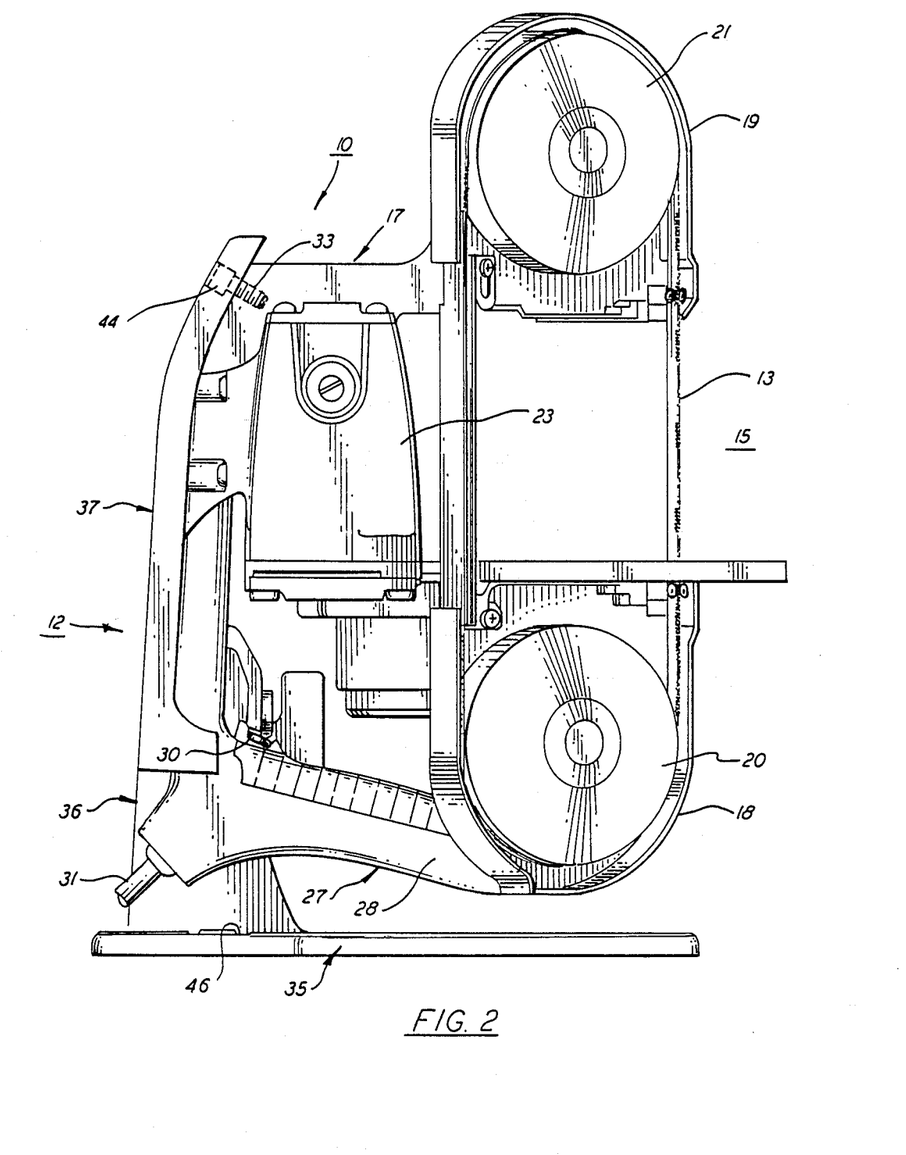
FIG. 2 is a rear elevation of the stand and band saw assembly illustrated in FIG. 1.
Figure 3:
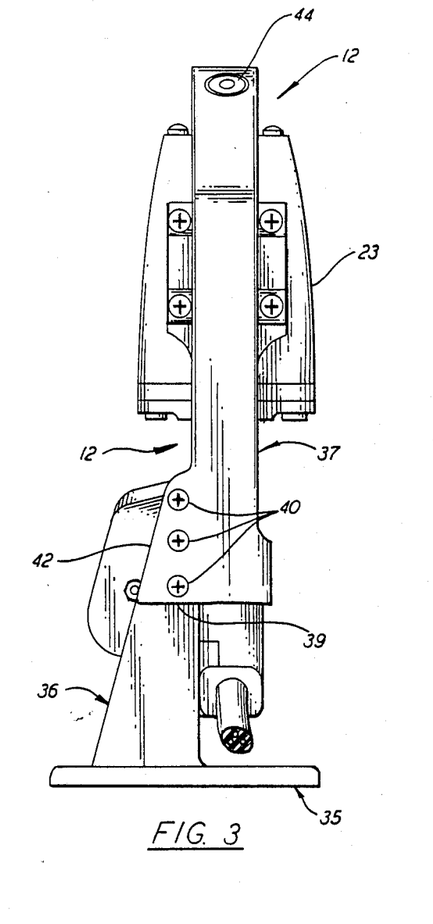
FIG. 3 is a partial rear elevation of the stand shown in FIGS. 1 and 2 further illustrating a removable arm that is affixed to the stand.
Figure 4:
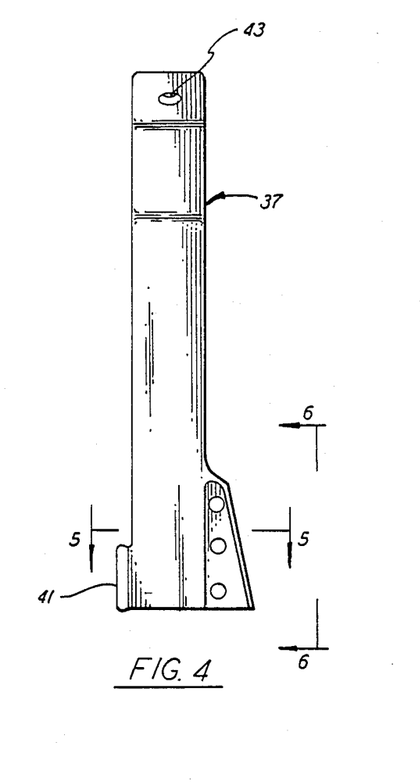
FIG. 4 is a front view of the removable arm shown in FIG. 3.
Figure 5:
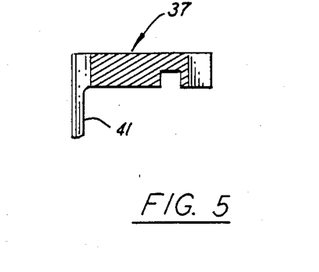
FIG. 5 is a section taken through the arm along lines 5—5 in FIG. 4.
Figure 6:
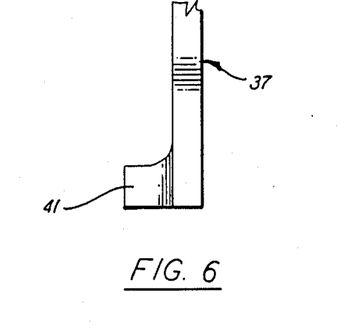
FIG. 6 is a partial side view taken along lines 6—6 in FIG. 4.

A hand-held knob 32, which is shown in phantom outline in FIG. 1, is typically threaded into a hole 33 located at the front of the main machine casing to provide a second hand grip for the operator. Normally, the operator will grasp the hand grip of the trigger guard with one hand and the knob with the other hand and guide the exposed section of the saw blade 13 into a workpiece. As can be seen, the weight of the motor is suspended between the two hand holds thereby making the tool more easily maneuverable and for providing greater safety to the operator In the present application, where the saw is mounted within the stand 12, the hand knob 32 is removed (unscrewed) from the casing and the threaded hole 33 used to attach the tool to the stand in the manner to be described below The stand 12 includes a horizontally disposed base plate 35, a vertically disposed pedestal 36 fixedly secured to the base plate, and an interchangeable raised arm 37 that i removably secured to the pedestal With further reference to FIGS. 3 through 6, the pedestal and the base are preferably cast or otherwise formed from a single piece of metal. A recess 39 is provided in the back of the pedestal in which the support arm is securely seated. The support arm is attached to the pedestal by means of three self-locking screws 40—40 or any other removable fastener that will permit the arm to be removed from the pedestal. The support arm contains a small protruding side wall 41 which, in assembly, is situated opposite a companion side wall 42 formed in the pedestal. The two side walls cooperate to form an open front cradle in which the trigger guard of a band saw suspended in the stand can be securely seated. The arm of the stand extends upwardly along the backbone of the tool casing and is bent slightly at the distal end thereof so that it overlies the threaded hole 33 formed in the front of the casing. A counter sunk hole 43 is machined in the distal end of the arm to receive a locking screw 44 therein. The screw is turned into threaded hole 33 to draw the casing of the saw tightly against the support arm and lock the trigger guard in the cradle to suspend the saw within the stand in a generally upright position as seen in FIGS. 1 and 2. Preferably, the base is wide enough to support the saw in this upright position without the danger of the saw tipping over. A series of recessed holes 46 are provided in the base through which lag bolts 47 or the like can be passed into an underlying work bench 48 thus allowing the stand to be bolted in place to provide a more stable support. C-clamps can also be used to secure the base to a suitable substrate.

Figure 7:
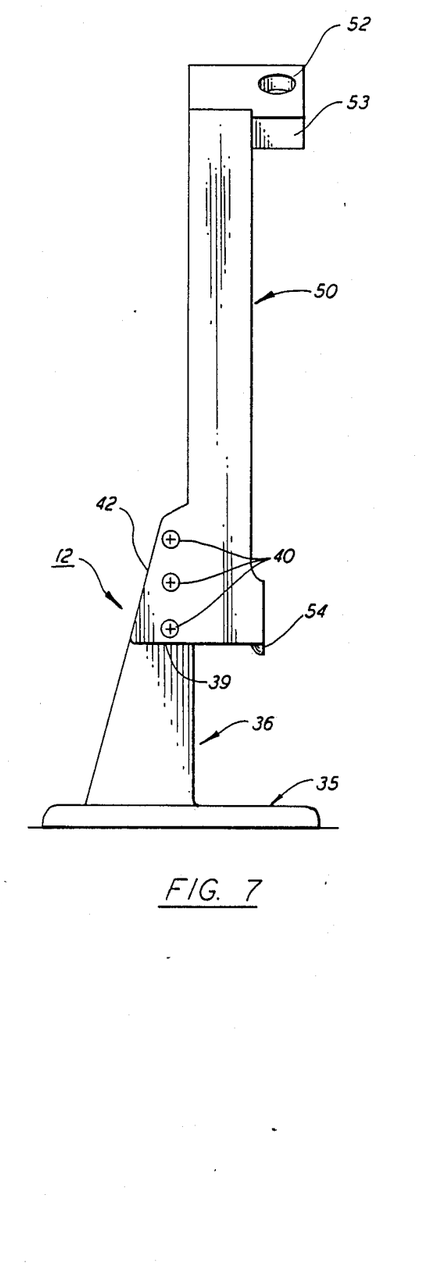
FIG. 7 is a rear elevation of another embodiment of a stand of the present invention wherein a removable arm having a different geometry is shown mounted upon said stand.
Figure 8:
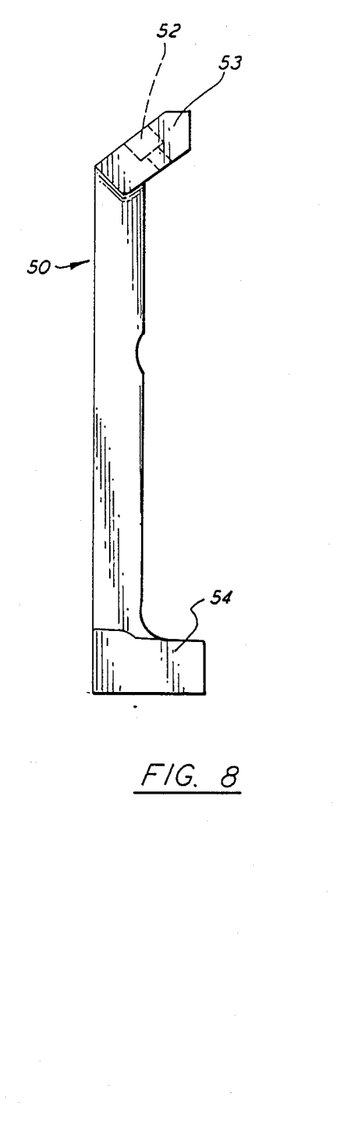
FIG. 8 is a side view of the removable arm shown in FIG. 7.
Figure 9:
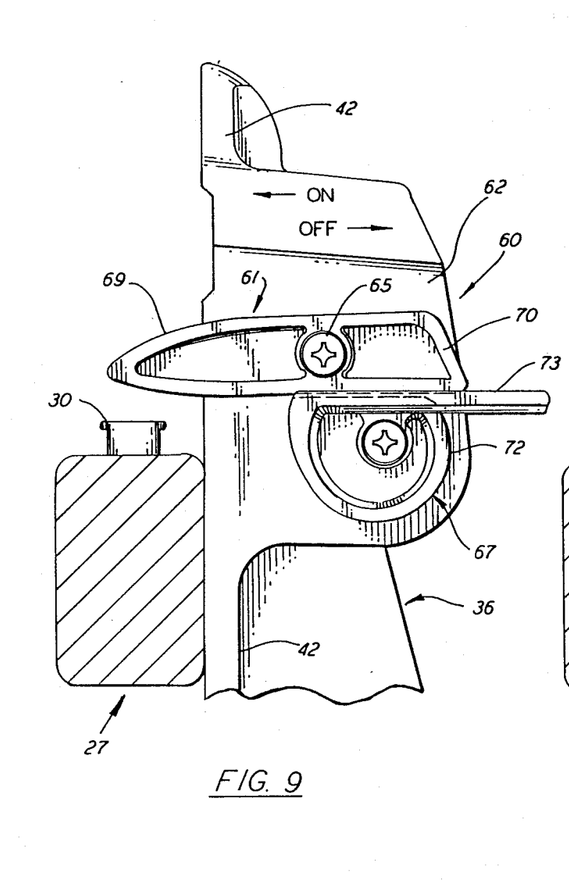
FIG. 9 is an enlarged partial end view of the present stand showing a trigger actuating mechanism associated with the pedestal with the mechanism in a trigger releasing position.

Turning now to FIGS. 7 and 8, a second support arm 50 is shown mounted upon pedestal 36 in place of the previously noted arm 37. Arm 50 is adapted to mate with a different brand saw than that shown in FIGS. 1 and 2. Here again, the lower part of the arm is arranged to seat securely in the recess provided in the pedestal and is locked to the pedestal by means of the previously noted screw 40—40. In this particular embodiment, the distal end of the support arm is brought to a slightly higher elevation to accommodate different brand saws. A pad 53 is carried on the distal end of the arm and is angled downwardly from the main section of the arm. The pad contains an offset hole 52 for receiving therein a locking bolt of the type described above. A partial side wall 54 is located in the bottom section of the support arm which coacts with the pedestal side wall 42 to establish a cradle for the trigger guard of the band saw. The width of the cradle between sidewalls 54 and 42 may be slightly greater than that of the saddle shown in FIGS. 1 and 2 in order to accommodate a wider trigger guard. As can be seen, by simply replacing the smaller arm 37 with a second larger arm, the present stand can be quickly adapted for use in association with slightly larger or different size tools provided the tools have the same general configuration found in the newer model saws.

Figures 10, 11, 12:
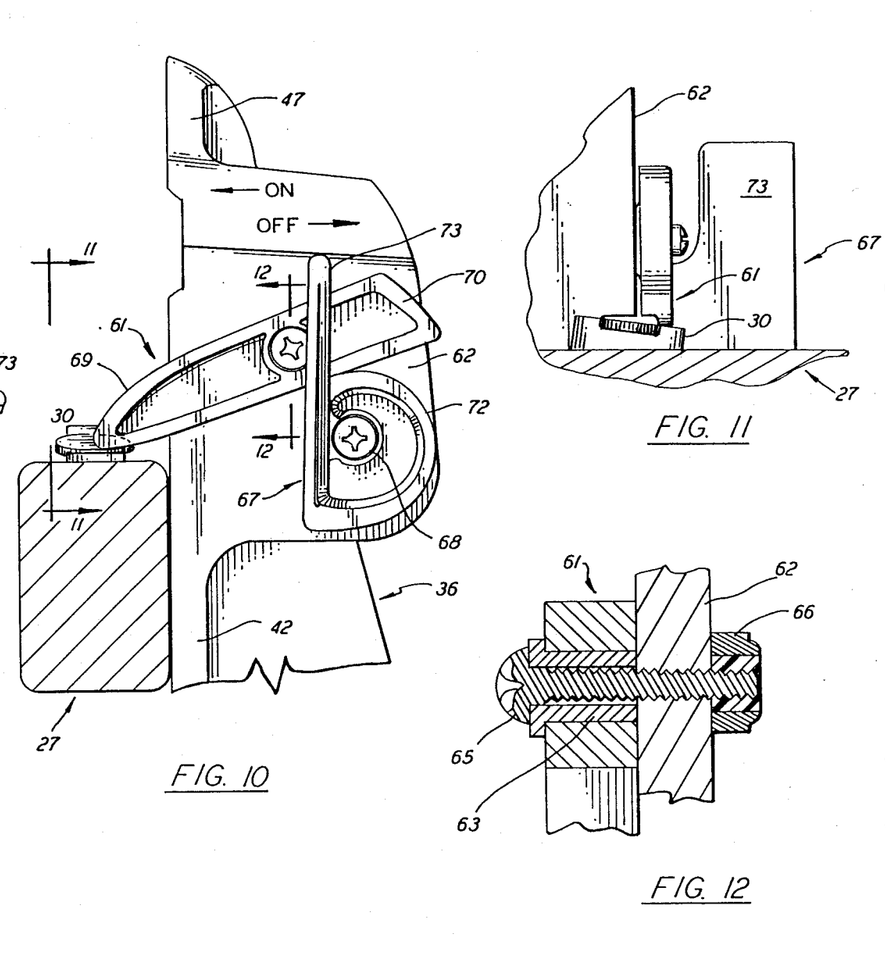
FIG. 10 is a view similar to that shown in FIG. 9 wherein the trigger actuated mechanism is shown depressing the trigger of a band saw suspended in the stand.
FIG. 11 is an end view taken along lines 11—11 in FIG. 10.
FIG. 12 is a partial sectional view taken along lines 12—12 in FIG. 10.

As further illustrated in FIGS. 9 through 12, the stand of the present invention is equipped with a trigger actuating mechanism generally referenced 60 that is designed to engage the trigger of a saw supported within the stand and hold the trigger at any desired setting. The actuating mechanism includes a lever arm 61 that is mounted within the pedestal 36 of the stand upon a flat wall 62 cast into the pedestal. The arm contains a bushing 63 through which a threaded pivot screw 65 is passed. The screw, in turn, is passed through the wall 62 and is held in place by a locking nut 66 (FIG. 12). A camming device 67 is similarly secured in wall 62 by means of a pivot screw 68 so that the camming device is situated immediately below the lever arm. The front end 69 of the lever arm extends into the cradle region of the stand so that it is able to engage the trigger of the saw mounted therein. The back end 70 of the arm is arranged to contact the cam face 72 of the camming device. The camming device has an outwardly disposed thumb tab 73 by which the unit can be turned about the pivot 68.

The cam face 72 of the camming device is generated so that the unit will hold the lever arm in any desired position against the biasing action of the trigger. Accordingly, when the mechanism is used in conjunction with a variable speed saw, the trigger can be placed at any setting needed to maintain the saw blade at a desired speed. In the case of a single speed tool, the arm can be moved to a position so as to set the saw at an "on" condition whereby the saw will run continuously at the set speed until the actuating mechanism is moved to a release position.

As illustrated in FIGS. 13-16, the present stand is further equipped with a work table 90 that can be attached to a saw suspended within the stand. Most, if not all commercially available band saws of the type herein described have a guide member attached to the casing in the work station that protrudes outwardly beyond the saw blade 13. When the saw is being used as a portable tool, the guide is placed in contact against the workpiece and the blade is moved into the work. The guide member, however, provides little, if any, support for the work when the tool is mounted in an upright position within the stand.

Figures 13, 14, 15, 16:
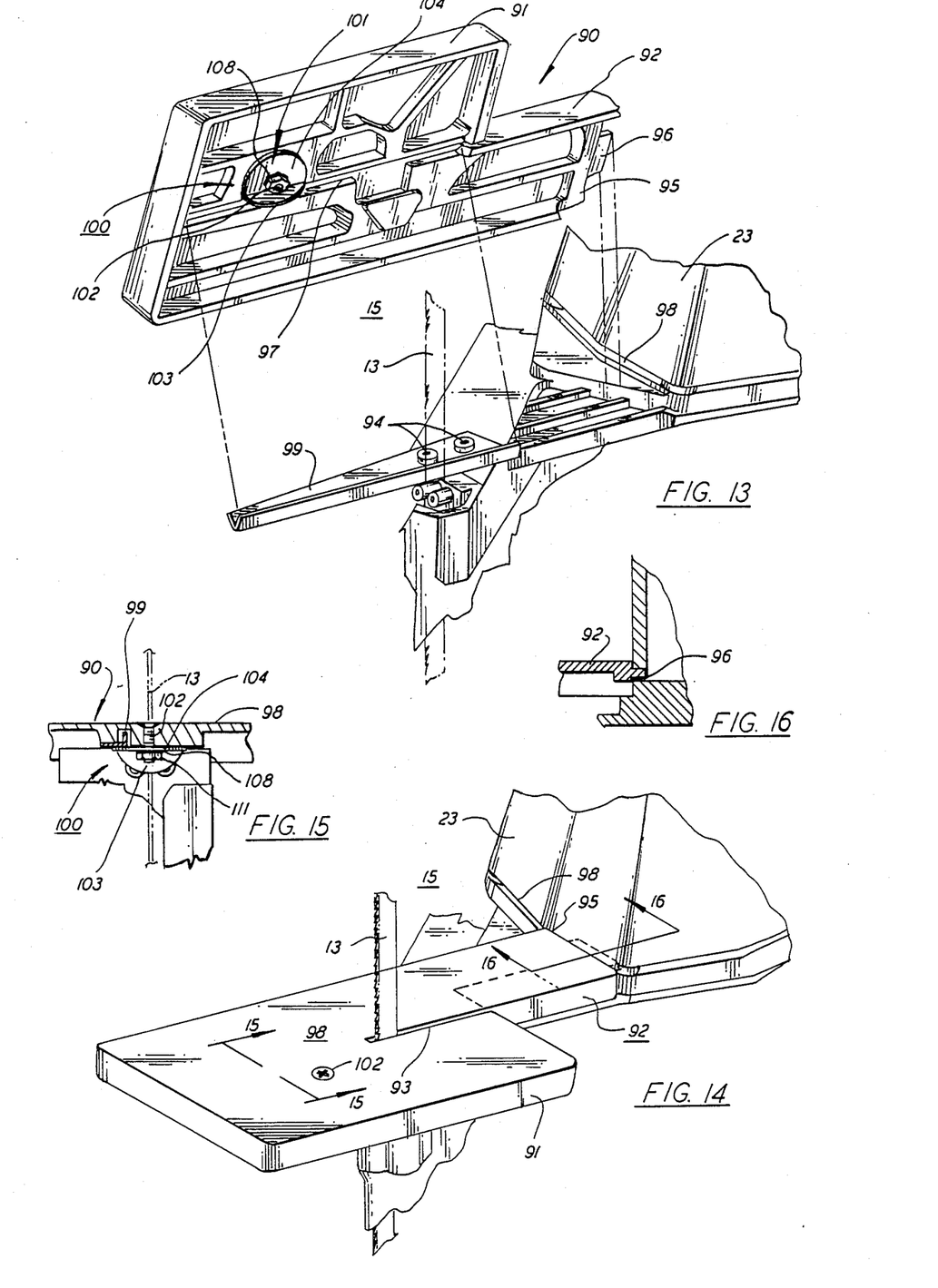
FIG. 13 an enlarged partial perspective view of the work station of a saw blade mounted in the stand showing in further detail work table adapted to be mounted upon the saw.
FIG. 14 is a Partial perspective view similar to that shown in FIG. 13 showing the work table mounted in an operative position within the work station.
FIG. 15 is a partial sectional view taken along lines 15—15 in FIG. 14.
FIG. 16 is a second partial sectional view taken along lines 16—16 in FIG. 14.

Table 90 includes a wide front section 91 that is attached to a narrower back section 92. The two sections combine to provide a flat top surface 98 which can be used as a stable support platform for a workpiece. The table contains a slotted opening 93 through which the saw blade is free to move when the table is attached to the saw in the manner explained below. In this particular embodiment of the invention, the guide member is an angular shaped element that is attached to the tool casing by means of a pair of screws 94—94. The underside of the table contains a groove 97 in which the guide member can be securely seated in assembly. In addition, the end wall 95 of the back section of the table is provided with an outwardly disposed boss 96 that is arranged to pass into an air vent 98 found in the motor housing 23. With the guide member securely seated in groove 97, the table is clamped to the guide member by means of a clamping mechanism generally referenced 100. The clamping mechanism is an annular locking disk 101 that is pivotally mounted in the underside of the table by screw 102 that is located adjacent to the guide receiving groove 97. A section of the disk is turned downwardly at ninety degrees to provide a thumb tab 103 which, when positioned as shown in FIG. 13, allows the guide member to pass freely into the groove 97. Turning the disk about the pivot screw will bring the main body 104 of the locking disk over the guide member. A spring wave washer 108 is placed under the nut 111(FIG. 15) which bears against the lower face of the locking disk. Sufficient pressure is exerted upon the wave washer by the nut so that the locking disc is held in any desired position that it is placed. The disc can thus be rotated by use of the thumb tab between a table locking position and a table release position.

While this invention has been explained with reference to the structure disclosed herein, it is not confined to the details set forth and this application is intended to cover any modifications and changes as may come within the scope of the following claims.

What is claimed is:

1. A stand for supporting a portable band saw of the type having a motor mounted in a casing over the saw blade so that the axis of the motor is generally parallel with said saw blade, a trigger mounted in a trigger guard behind the motor and a threaded hole for receiving a hand engageable grip in the casing forward of the motor, said stand including a support unit having a horizontally disposed base, a vertically disposed pedestal mounted on said base, a vertically disposed rigid arm secured to the top section of said pedestal, hanger means mounted in the top of said arm for removably engaging the front of the saw casing to suspend said saw in an upright position in said stand with said trigger guard positioned beneath the motor directly over said base whereby an exposed portion of the saw blade passes vertically through a work station, and open channel means mounted beneath the hanger means that include a pair of rigid spaced apart members for slidably receiving therein a portion of the trigger guard to prevent movement of the saw in said stand when a workpiece engages said blade in the work station.

2. The stand of claim 1 that further includes threaded fastening means for removably securing the arm to the pedestal whereby the arm can be replaced in the stand to accommodate different size saws in said stand.

3. The stand of claim 1 that further includes an adjustable trigger actuating means mounted on the pedestal for holding the trigger of a saw suspended in the stand at a desired setting.

4. The stand of claim 3 wherein the trigger actuating means further includes a lever arm pivotally supported in the pedestal that is arranged to engage the trigger of a saw suspended in the stand to depress said trigger and a camming means riding in contact with the lever arm for rotating the arm to a desired position whereby the trigger can be set at a desired setting.

5. The stand of claim 1 wherein said hanger means includes a threaded bolt means mounted in the top of said arm that is arranged to be threaded into said threaded hole located in the front of said casing.

6. The stand of claim 1 that includes a work table having a slotted opening therein through which said saw blade can pass and clamping means for securing the table to the casing to position said table adjacent to said work station.

7. The stand of claim 6 wherein said table further includes a groove in the bottom surface thereof, a guide member attached to the casing that is receivable in said grooves, and said clamping means being arranged to close said groove to secure the table to said member.

8. The stand of claim 2 wherein said open channel means includes one side wall mounted in the pedestal and an opposing side wall mounted in the removable arm whereby the width of the cradle can be altered by changing the arm in said pedestal.

9. The stand of claim 1 that further includes means for rigidly attaching the base of the stand to a support means.

* * * * *